No. 756,320. PATENTED APR. 5, 1904.
J. J. BERRIGAN.
CENTRIFUGAL CREAM SEPARATOR.
APPLICATION FILED AUG. 15, 1903.
NO MODEL.

WITNESSES
M. F. Ellis
William B. Marler

INVENTOR
John Joseph Berrigan
BY
ATTORNEYS

No. 756,320. Patented April 5, 1904.

UNITED STATES PATENT OFFICE.

JOHN JOSEPH BERRIGAN, OF ORANGE, NEW JERSEY, ASSIGNOR TO THE DE LAVAL SEPARATOR COMPANY, A CORPORATION OF NEW JERSEY.

CENTRIFUGAL CREAM-SEPARATOR.

SPECIFICATION forming part of Letters Patent No. 756,320, dated April 5, 1904.

Application filed August 15, 1903. Serial No. 169,563. (No model.)

*To all whom it may concern:*

Be it known that I, JOHN JOSEPH BERRIGAN, a citizen of the United States, residing at Orange, county of Essex, and State of New Jersey, have invented a new and useful Improvement in Centrifugal Cream - Separators, of which the following is a full, clear, and exact description, reference being had to the accompanying drawings, which form a part of this specification.

My invention has for its object certain improvements in that class of separators in which the liquid-space of the bowl is provided with a plurality of superposed conical disks, and has for its object to provide means to distribute the incoming full milk between the disks around the disks, so that the milk will be distributed around the space between the disks and not delivered at the same point of the bowl between each pair of disks.

I will first describe the embodiment of my invention, illustrated in the accompanying drawings, and then point out the invention in the claims.

Figure 3:
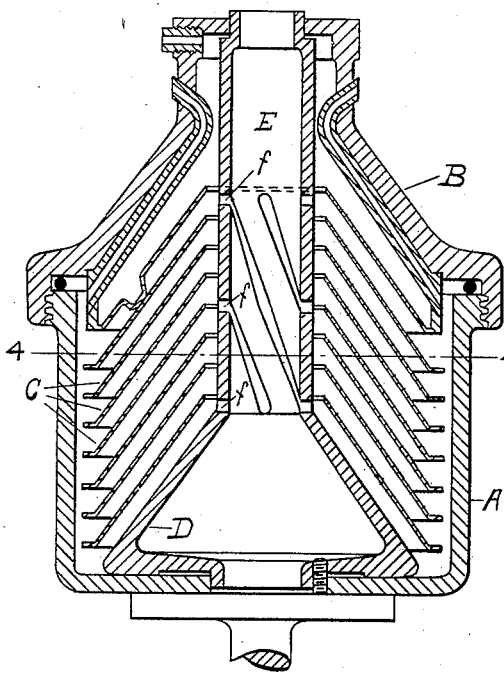
Figure 1:
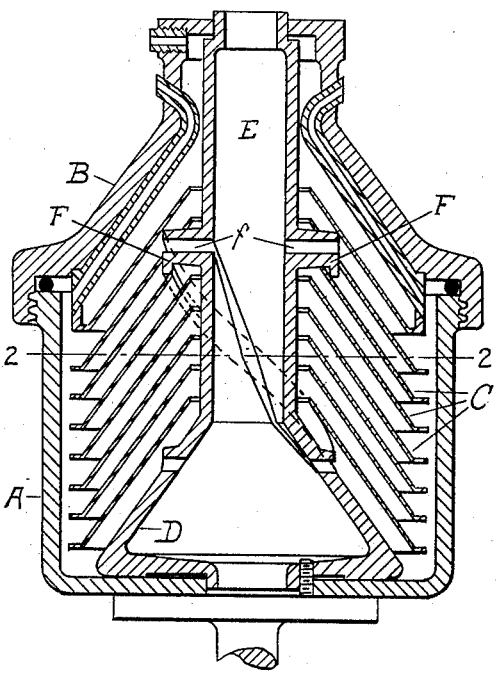
Figure 4:
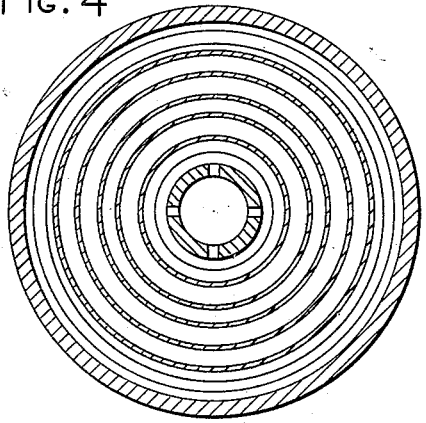
Figure 2:
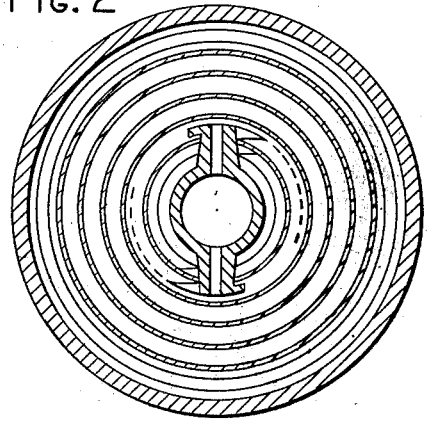

In the drawings, Figure 1 is a vertical section of a separator embodying my invention. Fig. 2 is a section on line 2 2, Fig. 1. Fig. 3 is a view similar to Fig. 1 without flange-spiral. Fig. 4 is a section on line 4 4, Fig. 3.

A is the bowl; B, the cover; C C, &c., superposed conical disks in the liquid-space of the bowl; D, the slime-collector; E, the central feed-tube; F, a flange projecting from and extending in spiral form around the feed-tube E and having the slotted opening *f*. In practice this flange projects outward a distance sufficient so that the mouth is beyond the cream zone. I have also shown in the drawings a plurality of spiral orificed flanges F. My improvement may be carried out with one or a plurality of such flanges F.

If it is not desired to project the full milk beyond the cream zone, the flange F need not be used and the spiral orifices *f* placed through the tube E, as shown in Fig. 3. As may be seen, the full milk passing through the feed-tube F is delivered between the disks C in a spiral path, thus distributing the incoming milk with reference to each spiral at different points around the bowl with reference to the spaces between successive disks.

Having now fully described my invention, what I claim, and desire to protect by Letters Patent, is—

1. In a centrifugal liquid-separator, the combination with a division contrivance consisting of a series of superposed conical division-plates, of an orificed inlet and distributing device extending vertically and in a spiral path through and intersecting said plates and opening into the space between adjacent plates.

2. In a centrifugal liquid-separator, the combination with a division contrivance consisting of a series of superposed conical division-plates, of a plurality of orificed inlet and distributing devices extending vertically and in a spiral path through and intersecting said plate and opening into the space between adjacent plates.

3. In a centrifugal liquid-separator, the combination with a division contrivance consisting of a series of superposed conical division-plates, and a central feed-tube, of an orificed inlet and distributing device extending vertically and in a spiral path around said central feed-tube, and opening into the space between adjacent plates.

4. In a centrifugal liquid-separator, the combination with a division contrivance consisting of a series of superposed conical division-plates, and a central feed-tube, of a plurality of orificed inlet and distributing devices extending vertically and in a spiral path around said central feed-tube and opening into the space between adjacent plates.

5. In a centrifugal liquid-separator, the combination with a division contrivance consisting of a series of superposed conical division-plates and a central feed-tube, of an orificed flange projecting from and extending spirally around said central feed-tube and opening into the space between adjacent plates.

6. In a centrifugal liquid-separator, the combination with a division contrivance consisting of a series of superposed conical division-plates and a central feed-tube, of a plurality of orificed flanges projecting from and extending spirally around said central feed-tube and opening into the space between adjacent plates.

In testimony of which invention I have hereunto set my hand, at Deadwood, South Dakota, on this 15th day of July, 1903.

JOHN JOSEPH BERRIGAN.

Witnesses:
WILLIAM A. BOX,
HENRY T. WARNECKE.